Aug. 1, 1933.   T. G. MYERS   1,920,315
DYNAMO ELECTRIC MACHINE
Filed Aug. 4, 1930
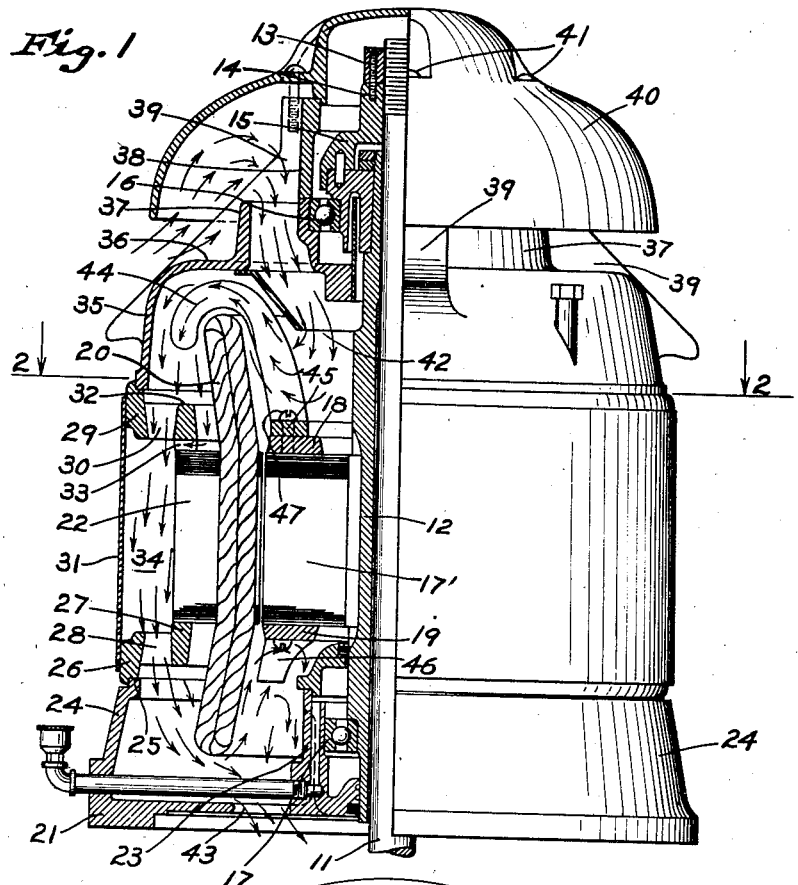
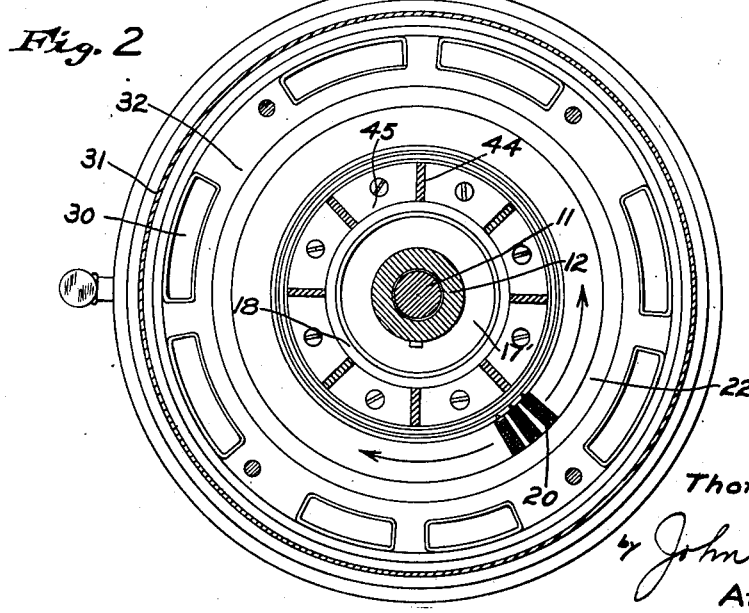
Inventor
Thomas G. Myers
by John Flam
Attorney

UNITED STATES PATENT OFFICE 1,920,315

DYNAMO-ELECTRIC MACHINE

Thomas G. Myers, Los Angeles, Calif., assignor to U. S. Electrical Manufacturing Company, Los Angeles, Calif., a Corporation of California Application August 4, 1930. Serial No. 472,788

7 Claims. (Cl. 172—36.)

This invention relates to electric apparatus, and particularly to a dynamo electric machine, such as a motor.

Such motors are now in common use for operating any desired loads. For example, motors having shafts vertically disposed have been useful to operate deep well pumps, such as oil well pumps, and water wells.

It is one object of my invention to provide such a motor that can operate effectively in this manner without overheating. It is now well known that economies in motor construction are effected by providing cooling or ventilating means therefor, so that the waste heat is dissipated rapidly.

The smaller the motor, in general, the greater must be its heat dissipation from a unit surface of radiating area, for the same load. Therefore if these radiating areas are ventilated so as to permit them to transfer the waste heat rapidly, the size of the motor can be reduced without injuriously affecting the insulation or the windings.

It is one object of my invention to provide an effective and simple system for sending a stream of ventilating air past the windings and the laminations of the motor.

Since such motors as I have referred to are very often utilized in exposed or outdoor locations, it is essential that it be weather proof, and it is another object of my invention to provide an outdoor motor that cannot be damaged by weather conditions, and that yet permits free ingress and egress of the ventilating stream of air.

In order to insure effective cooling, I arrange matters in such a way that the ventilating stream passes in a tortuous manner through the motor casing, and it is accordingly another object of my invention to provide a mechanism whereby this tortuous stream of air is effectively passed through the motor.

My invention possesses many other advantages, and has other objects which may be made more easily apparent from a consideration of one embodiment of my invention. For this purpose I have shown a form in the drawing accompanying and forming part of the present specification. I shall now proceed to describe this form in detail, which illustrates the general principles of my invention; but it is to be understood that this detailed description is not to be taken in a limiting sense, since the scope of my invention is best defined by the appended claims.

Referring to the drawing:

Figure 1 is a half elevation and half sectional view of a motor embodying my invention; and Fig. 2 is a sectional view taken along plane 2—2 of Fig. 1, but with the top casing removed.

The motor shaft 11 is shown in this instance as vertical and as being adjustable axially with respect to the motor. This can be accomplished, for example, by providing a sleeve 12 in which the shaft 11 is slidable. A nut 13 at the top of the shaft engages with threads in the top of shaft 11, and can be turned to raise or lower the shaft 11. This nut can be held in place rigidly to the sleeve, as by screws 14 that engage a collar 15 mechanically joined to the sleeve 12. This sleeve 12 carries the rotating element of the motor. It can be provided with upper or lower journals in any conventional manner, as for example, by the aid of the ball races 16 and 17.

In the present instance I have shown the essential parts of the motor as found in an induction motor. Thus, supported on sleeve 12 is a stack of laminations 17 having the usual clamping rings 18 and 19, which may also serve as end rings for a squirrel cage winding disposed in slots in laminations 17. The stationary part of the motor includes a stack of laminations 22 in which are disposed the stator windings 20.

I shall now describe how the motor casing serves to house the winding elements. Thus, I provide a base member 21. This base member has a central boss 23 in which is supported the stationary part of the ball bearing 17 for permitting the sleeve 12 to rotate. This base member 21 is also provided with a deep flange 24 defining a shoulder 25 for supporting a casing section 26. This casing section 26 is provided with a ring-like support 27 upon which is supported the stack of laminations 22. A series of air spaces or apertures 28 are provided in this section 26, which air spaces are disposed radially back of the laminations 22.

A casing section 29, similar to section 26, is disposed on top of the laminations 22. In this section also, there are a series of apertures 30 radially spaced back of the laminations 22. In order to form a complete casing around laminations 22, I provide a sheet metal member 31 that joins both sections 26 and 29, and which may be appropriately fastened to these sections.

The ring 32 that engages the top of laminations 22 is provided with cut away portions or slots so as to form a series of passageways 33 from the inside of section 29 to the space 34 between the outer surface of the laminations 22 and the casing member 31.

Disposed above and supported on the section 29 is an upper section member 35. This upper section member has a horizontal portion 36 and a deep flange 37. This flange defines a hollow space surrounding the structure 38 in which the upper ball bearings 16 are provided. This structure 38 in the present instance is shown as supported from the member 35 as by a series of hollow vanes 39. These vanes 39 extend upwardly and also serve as support for a bell-like cover 40, as by the aid of a series of bolts 41.

Since my invention does not in this instance relate particularly to the manner in which the casing sections are supported and joined together, I consider it unnecessary to detail this structure further. It is sufficient to note that the open mouth of the cover member 40 is directed downwardly and defines an annular space with flange 37, through which air can be drawn from outside of the casing to the inside of the space defined between the flange 37 and the structure 38. The bottom of the bell cover 40 is, for this purpose, spaced considerably above the horizontal portion of the member 35.

The course of the ventilating air stream is shown by the arrows in Fig. 1. A baffle 42 of cone form is provided below flange 37 so as to direct the air stream inwardly. This baffle 42 can be appropriately supported on section 35. The air stream, after it passes downwardly through the flange 37 and the constricting baffle 42, is permitted to rise again, back of this baffle upwardly to the space beneath the horizontal portion 36 of casing member 35. Thence it can proceed downwardly through apertures 30 and space 34 into and through apertures 28. This downward course takes the ventilating air past the entire length of the stack of laminations 22. The stream then extends downwardly past the lower portions of winding 20 and upwardly inside of these windings 20, and finally downwardly and out through apertures 43 in the base member 21. Some air is also by-passed through apertures 33 past the top of the laminations 22. Furthermore, some air instead of rising after it is past the bottom end of the windings 20 can proceed directly outward through the apertures 43.

It is particularly to be noted that the ventilating air alternately passes downwardly and upwardly so as to pass through a comparatively long path. Furthermore it passes around both the inside and outside of the projecting coil ends of the winding 20.

In order to propel the air through the path just traced I provide an upper fan which is mounted upon the rotating part of the motor. This fan includes a series of blades 44 that are detachably fastened by a ring 45 attached as by screws 47, to the top of the clamping ring 18. This fan has an extremity which extends over and beyond the top end of the coils making up winding 20. As shown clearly in Fig. 1, the fan blades extend into the annular space between this winding and the baffle or deflector 42. Thus, propulsion of these blades by rotation of sleeve 12 produces a motive power for the air stream, which is thus pushed through the space 34 and out through the apertures 43 in base 24. Since the stream of air passes around both ends of the winding 20, it keeps this winding cool. Thus, increased electrical efficiency is obtained. It is furthermore to be noted that the cover member 40, overlapping the flange 37 provides a substantially weather proof structure.

If desired, a series of agitator blades 46, fastened to the lower clamping ring 19 stirs or agitates the air in the lower part of the structure. However, the main driving force is provided by the driving blades 44 which are purposely extended over the coils to provide a large capacity.

I claim:

1. In a dynamo electric machine having a stationary and a rotary member, said members having a vertical axis, and a casing for said members, comprising an upright flange, cover member surrounding the flange and defining an annular space therewith, a deflector inside said casing and below the flange, and a fan having one or more blades that extend upwardly past the outside of the deflector.

2. In a dynamo electric machine having a stationary and a rotary member, said members having a vertical axis, and a casing for said member, comprising an upright flange, a cover member surrounding the flange and defining an annular space therewith, said stationary member having coils extending upwardly and below the flange, a deflector directed downwardly and toward the space inside of the coil ends, and a fan having one or more blades that extend upwardly between the deflector and the coil ends.

3. In a dynamo electric machine having a stationary and a rotary member, said members having a vertical axis, and a casing for said member, comprising a section having an upright flange, a cover member surrounding the flange and defining an annular space therewith, said stationary member having coils extending upwardly and below the flange, a deflector directed downwardly and toward the space inside of the coil ends, and a fan having one or more blades that extend upwardly between the deflector and the coil ends as well as over the coil ends.

4. In a dynamo electric machine having an outer stationary member and a rotary member, said members having a vertical axis, a casing having an opening at the top and entirely surrounding and supporting said stationary member but having its vertical wall spaced radially from the member to define a space between the outer surface of the stationary member and the wall of the casing, said casing being provided with a lower base section having a horizontal wall with one or more air discharge apertures therethrough for passing air from the space out of the casing, a cover member disposed to extend over the top opening of the casing and spaced therefrom to define an air inlet passageway, and means for driving air through said air inlet, through the space, and out through the discharge apertures.

5. In a dynamo electric machine having an outer stationary member and a rotary member, said members having a vertical axis, said stationary member having a winding of coils that project beyond the rest of the stationary member, a casing encompassing said stationary member but spaced from it to define a space between the outer surface of the stationary member and the wall of the casing, and a fan structure having one or more open blades that extend close to the projecting end of the coils to pass air around the coils and down through the space.

6. In a dynamo electric machine having an outer stationary winding member and a rotary member, said winding member having coils with projecting ends, a casing surrounding the stationary winding member and having a wall spaced therefrom to define a space between the outer surface of the stationary member and the said wall, and means for producing a current of ventilating air in a tortuous path around the coil ends and through the space, comprising a fan having one or more open blades that closely extend around the coil ends.

7. In a dynamo electric machine having an outer stationary member and a rotary member, said members having a vertical axis, said stationary member having a winding of coils that project beyond the rest of the stationary member, a casing encompassing said stationary member but spaced from it to define a space between the outer surface of the stationary member and the wall of the casing, said casing also having an opening for the entry of air at the top of the casing, a deflector extending below the opening and inside the projecting coil ends, and a fan structure having one or more open blades that extend closely between the deflector and the inner surfaces of the coils.

THOMAS G. MYERS.